US009638480B1

(12) United States Patent
Maranville

(10) Patent No.: US 9,638,480 B1
(45) Date of Patent: May 2, 2017

(54) SYSTEM AND METHOD FOR COOLING VEHICLE COMPUTING DEVICE

(71) Applicant: Ford Global Technologies, LLC, Dearborn, MI (US)

(72) Inventor: Clay Wesley Maranville, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/016,699

(22) Filed: Feb. 5, 2016

(51) Int. Cl.
G06F 7/00 (2006.01)
F28F 7/00 (2006.01)
E03B 1/00 (2006.01)
F28F 27/02 (2006.01)
G05D 1/00 (2006.01)
F28D 15/00 (2006.01)
F25B 5/02 (2006.01)
F25B 41/04 (2006.01)
F25B 49/02 (2006.01)
B60H 1/32 (2006.01)
G06F 1/20 (2006.01)
F28D 21/00 (2006.01)

(52) U.S. Cl.
CPC .......... *F28F 27/02* (2013.01); *B60H 1/3204* (2013.01); *F25B 5/02* (2013.01); *F25B 41/04* (2013.01); *F25B 49/02* (2013.01); *F28D 15/00* (2013.01); *G05D 1/0088* (2013.01); *G06F 1/20* (2013.01); *F25B 2600/2515* (2013.01); *F25B 2700/1931* (2013.01); *F28D 2021/0028* (2013.01); *F28F 2265/18* (2013.01)

(58) Field of Classification Search
USPC ................. 701/36; 165/80.2; 137/1
See application file for complete search history.

(56) References Cited

U.S. PATENT DOCUMENTS

| 7,616,443 | B2 | 11/2009 | Walter |
| 7,789,176 | B2 | 9/2010 | Zhou |
| 8,015,833 | B2 | 9/2011 | Cikanek et al. |
| 8,459,388 | B2 | 6/2013 | Kim |
| 8,820,395 | B2 | 9/2014 | Yatskov |
| 2009/0139781 | A1* | 6/2009 | Straubel ............ B60L 11/1875 180/65.1 |
| 2010/0005822 | A1 | 1/2010 | Bering et al. |

(Continued)

FOREIGN PATENT DOCUMENTS

CN 201803519 U 4/2011
EP 1302731 A1 4/2003

Primary Examiner — Thomas G Black
Assistant Examiner — Tyler Paige
(74) Attorney, Agent, or Firm — Frank MacKenzie; Bejin Bieneman PLC

(57) ABSTRACT

A vehicle computer is programmed to determine an expected thermal load for an autonomous driving compute cluster and a target temperature for the compute cluster under the expected thermal load. Based on a comparison of a current temperature of the compute cluster to an ambient temperature, the vehicle computer is further programmed to operate a switching valve in a first coolant path to open the path to one of a radiator portion and a condenser portion and operate, with the path open to the condenser portion, a pump in the first coolant path and a condenser in a second coolant path at speeds respectively based on at least one of the expected thermal load and the target temperature.

20 Claims, 4 Drawing Sheets

(56) References Cited

U.S. PATENT DOCUMENTS

| | | | | |
|---|---|---|---|---|
| 2011/0139131 A1* | 6/2011 | Kardos | ................... | F01P 3/12 |
| | | | | 123/542 |
| 2013/0104995 A1* | 5/2013 | Morishita | ............. | F16L 53/001 |
| | | | | 137/1 |
| 2014/0190183 A1* | 7/2014 | Berger | ................. | F04B 39/064 |
| | | | | 62/3.2 |
| 2014/0334917 A1* | 11/2014 | Yoshida | ................ | F04D 29/164 |
| | | | | 415/119 |
| 2015/0052928 A1* | 2/2015 | Uchida | ............. | B60H 1/00278 |
| | | | | 62/239 |
| 2016/0108301 A1* | 4/2016 | Shou | ................... | H01L 23/473 |
| | | | | 165/80.2 |

* cited by examiner

SYSTEM AND METHOD FOR COOLING VEHICLE COMPUTING DEVICE

BACKGROUND

Generally, mass production vehicles are incorporating a significantly increased amount of computations, based on input from existing vehicle network signals and sensors, as well as new sensors and information from the environment (such as vehicle-to-vehicle communications, cloud-based sources, etc.). One design strategy for, e.g., an autonomous vehicle, is to execute autonomous vehicle driving computations in a "compute cluster," rather than being distributed throughout the vehicle, e.g., in existing computing devices. Such a cluster would generate significant amounts of heat (e.g., 1-4 kilowatts) as a byproduct of the high demand computation process and close-packed arrangement of the included computing devices. In order to maintain high reliability, it is desirable, but currently difficult, to remove such a level of heat generated in, e.g., an autonomous vehicle compute cluster.

DRAWINGS

Figure 1:
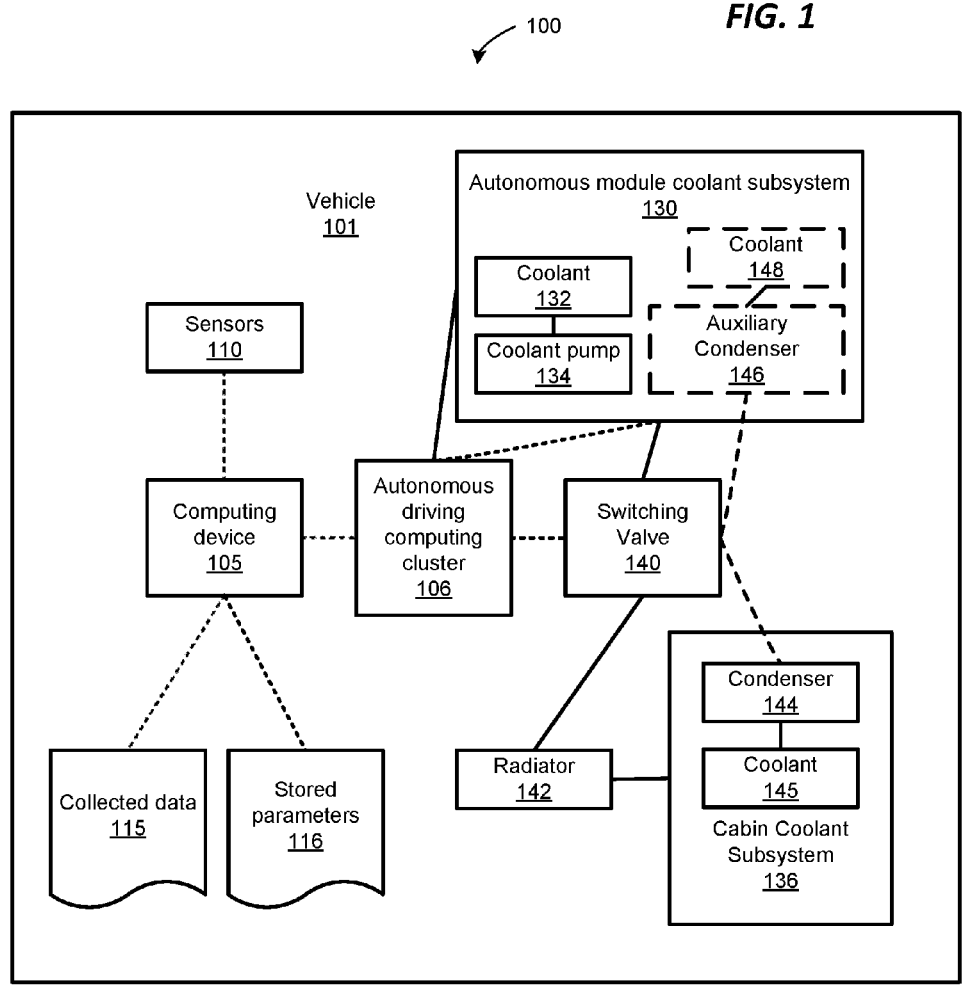

FIG. 1 schematically illustrates an exemplary autonomous vehicle system.

Figure 2:
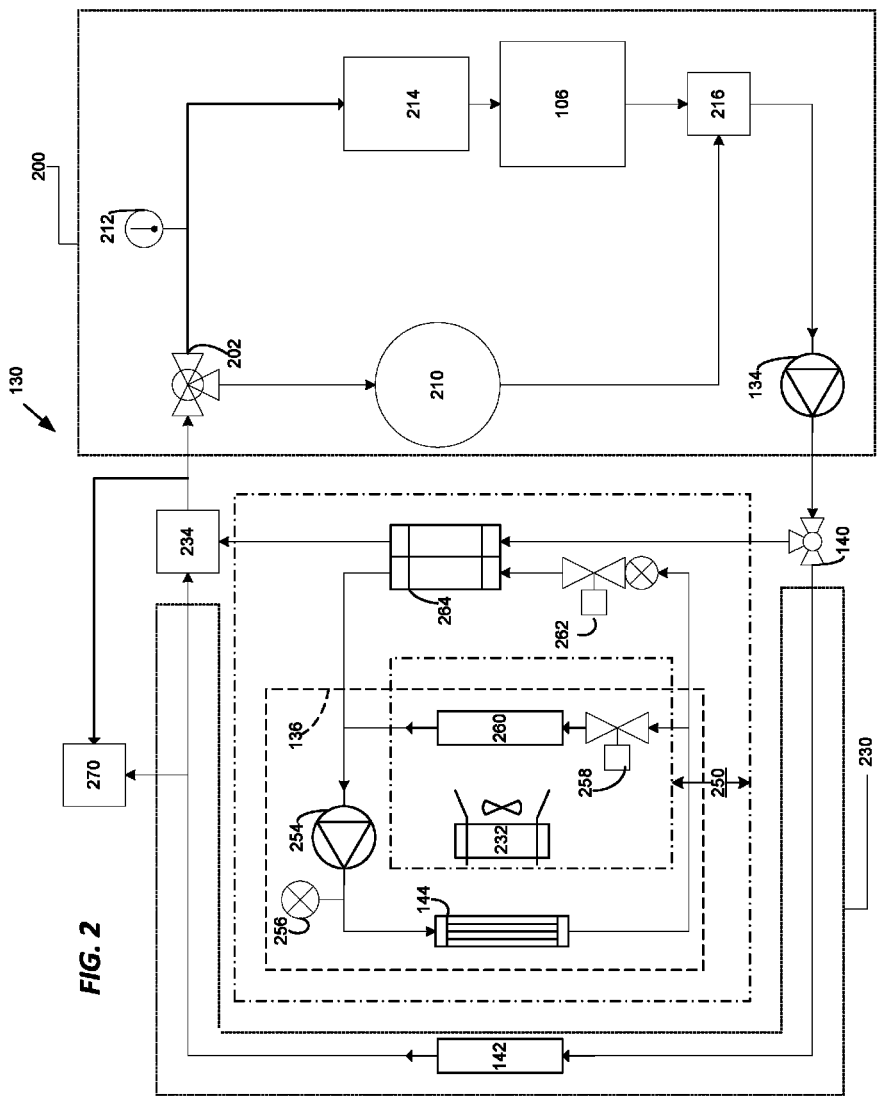

FIG. 2 schematically illustrates an exemplary vehicle computer cooling system.

Figure 3:
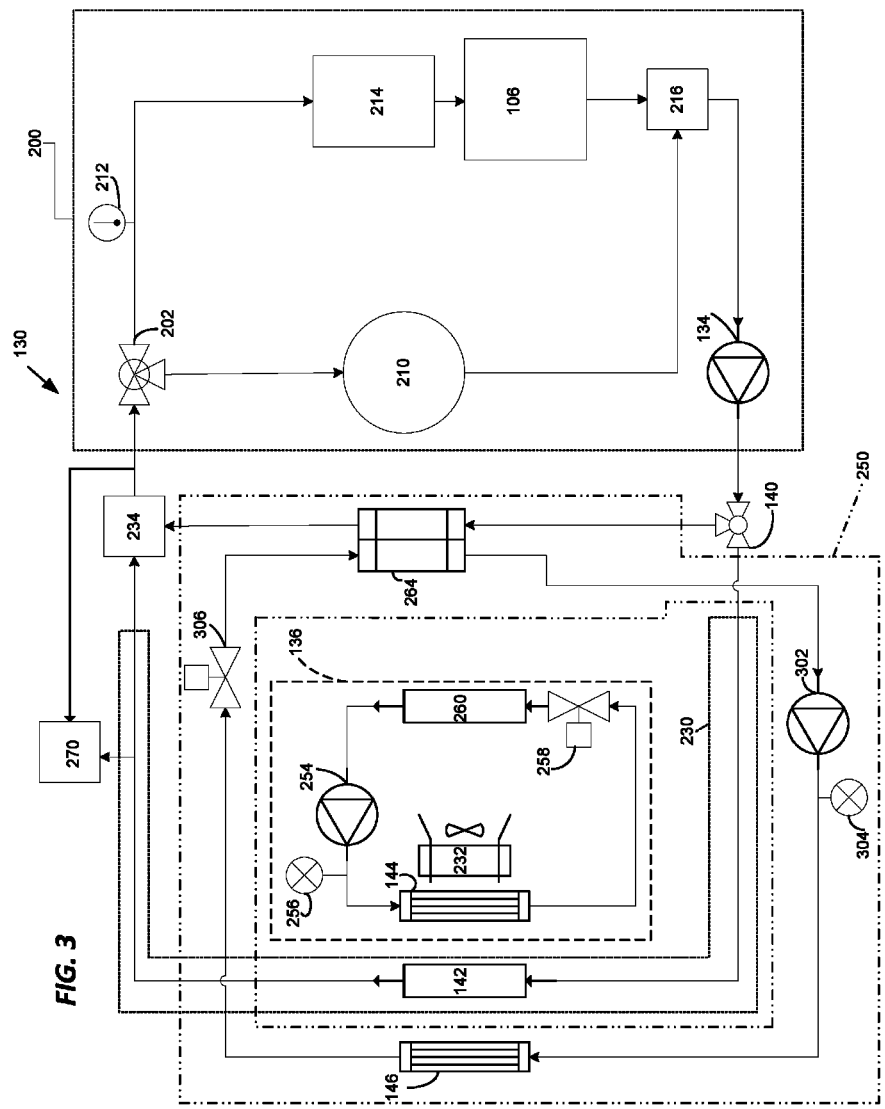

FIG. 3 schematically illustrates another exemplary vehicle computer cooling system.

Figure 4:
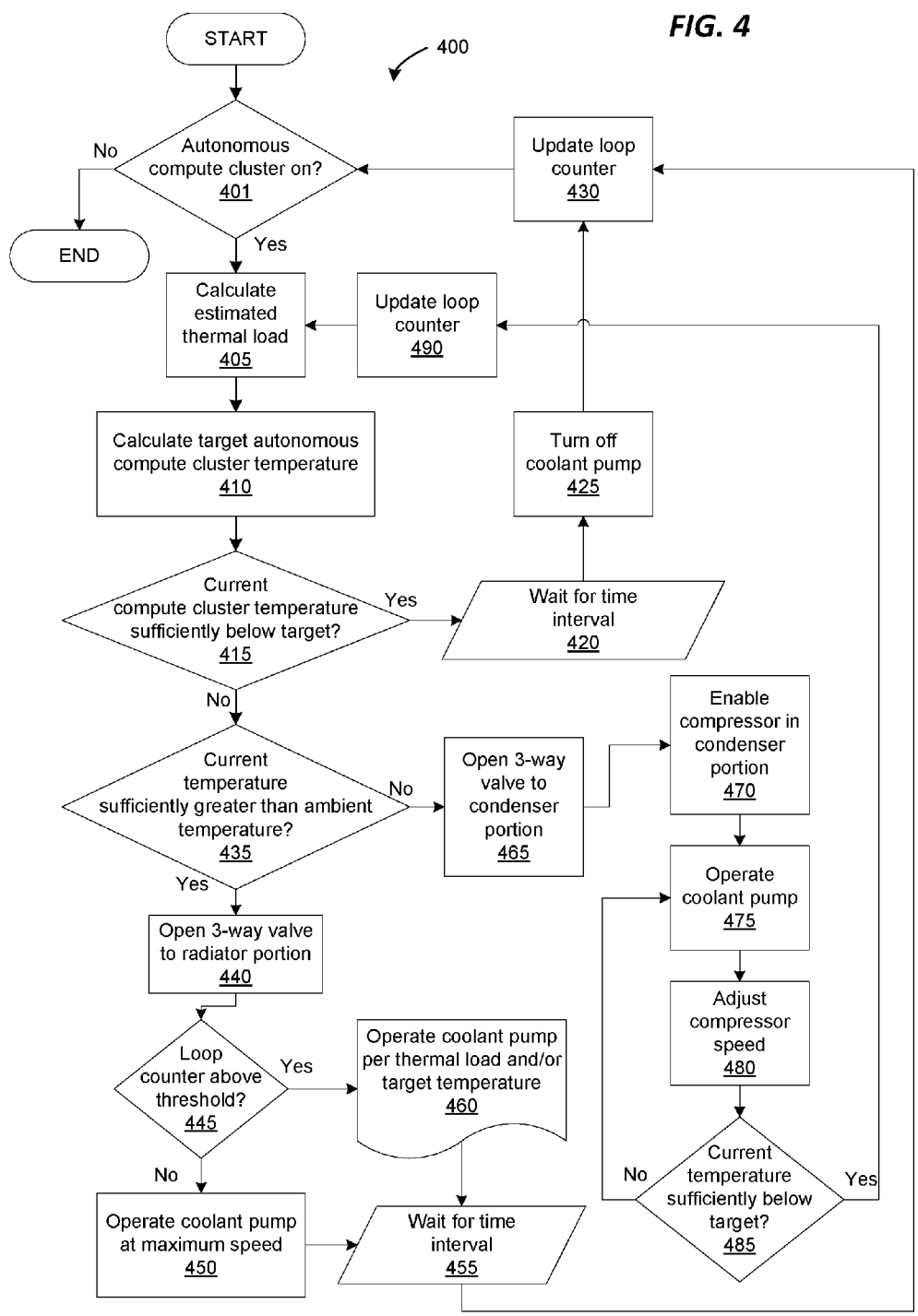

FIG. 4 is a diagram of an example process for controlling a vehicle computer cooling system.

DETAILED DESCRIPTION

Overview

FIG. 1 is a block diagram of an exemplary autonomous vehicle system 100. A vehicle 101 includes the vehicle computer 105 that is configured to receive information, e.g., collected data 115, from one or more sensors 110 related to various components or conditions of the vehicle 101, e.g., components such as a braking system, a steering system, a powertrain, etc., and/or conditions such as vehicle 101 speed, acceleration, pitch, yaw, roll, etc. The vehicle 101 includes an autonomous driving compute cluster or module 106 and, e.g., in the module 106, generally includes instructions for receiving data, e.g., from one or more sensors 110. The autonomous driving compute cluster 106 may be included in or separate from the computer 105.

The computer 105 may instruct the autonomous driving module 106 according to one or more stored parameters 116. By evaluating collected data 115 with respect to one or more stored parameters 116 being used during autonomous driving operations, the computing device 105 can determine whether to adjust one or more of the parameters 116. For example, the module 106 may change a parameter 116 to correspond with a temperature or another environmental condition, a status of a vehicle component or system, a detected object, the vehicle path, an oncoming vehicle, road condition, or the like.

The vehicle 101 further includes an autonomous module cooling subsystem 130 including coolant 132 and a coolant pump 134. Coolant 132 may be a variety of known substances, e.g., a mixture including, in part, ethylene or propylene glycol and water. Referring to FIGS. 2-3, the autonomous module cooling subsystem 130 thermally couples the coolant 132 to the autonomous driving module 106 in a computer portion 200 of the coolant path for the coolant 132. By way of example, computer or sensor components of the vehicle 101 may be thermally coupled to the autonomous module cooling subsystem 130 via one or more cold plates, through which heat may be exchanged towards cooling the respective components. The computer portion 200 may also include a proportional flow valve 202 to direct the coolant 132 to both the autonomous driving compute cluster 106 and, via thermal coupling by, e.g., one or more cold plates, one or more autonomous driving sensors 210, a subset of the sensors 110 of the vehicle 101. The proportional flow valve 202 may be adjusted or tuned to provide divide the flow in accordance with, e.g., the number and type of autonomous driving sensors 210 and the particular configuration and size of the autonomous driving compute cluster 106. A temperature sensor 212, a computer power supply 214, and a junction 216 may further be thermally coupled, for the sensor 212 and the power supply 214, and fluidly coupled, for the junction 216, in the computer portion 200 of the autonomous module cooling subsystem 130. In some implementations, the autonomous driving compute cluster 106 is powered by the power supply 214 with a relatively high voltage, e.g., 12 volts.

With additional reference to FIG. 2, a switching valve 140, which may be in the form of a three way valve, opens the computer portion 200 of the coolant path for the coolant 132 between one of a radiator portion 230 and a condenser portion 250. The radiator portion 230 includes a radiator 142, which is positioned adjacent an engine radiator 232. When the switching valve 140 opens the coolant path for the coolant 132 to the radiator portion, the coolant 132 flows through the radiator 142 and the junction 234 to return to the proportional flow valve 202.

The vehicle 101 further includes a cabin refrigerant subsystem 136, which includes a condenser 144, coolant 145, and a compressor 254. The compressor 254 may be in the form of an electric air conditioning compressor. A sensor 256 for measuring the pressure and/or sensor of the coolant 145 may be coupled adjacent the compressor 254, and a first valve 258 opens flow of the coolant 145 to a cabin evaporator 260. Referring to FIG. 2, in one implementation of an autonomous module cooling subsystem 130 of the present disclosure, the condenser portion 250 overlaps with the cabin refrigerant system 136, and a second valve 262 opens flow of the coolant 145 to a chiller 264.

Referring to FIG. 3, in another implementation of an autonomous module cooling subsystem 130 of the present disclosure, the condenser portion 250 is independent of the cabin refrigerant subsystem 136. The vehicle 101 includes an auxiliary condenser 146 and coolant 148 both separate from the cabin refrigerant subsystem 136. The vehicle 101 includes an auxiliary compressor 302, a sensor 304 for measuring the pressure and/or temperature of the coolant 148, and a shutoff valve 306, for controlling and monitoring the flow of the coolant 148 between the auxiliary condenser 146 and the chiller 264 as described herein. The auxiliary compressor 302 may be in the form of, e.g., an electric air conditioning compressor or a belt-driven compressor In each of the exemplary implementations of FIGS. 2-3, when the switching valve 140 opens the coolant path for the coolant 132 to the condenser portion, the coolant 132 flows through the chiller 264 and the junction 234 to return to the proportional flow valve 202.

The vehicle 101 may further include a de-gas bottle 270 coupled about the junction 234, e.g., to facilitate removal of gas from the coolant 132, to accommodate thermal expansion of the coolant 132, and/or to provide a reservoir for the coolant 132.

Exemplary Autonomous Driving System Elements

Referring again to FIG. 1, the vehicle computer 105 for vehicle 101 that generally include a processor and a memory, the memory including one or more forms of computer-readable media, and storing instructions executable by the processor for performing various operations, including as disclosed herein. Further, the computer 105 may include more than one computing device, e.g., the autonomous driving compute cluster 106 and other controllers or the like included in the vehicle 101 for monitoring and/or controlling various vehicle components, e.g., an engine control unit (ECU), transmission control unit (TCU), etc. The computer 105 is generally configured for communications on a controller area network (CAN) bus or any other suitable in-vehicle communications bus such as JASPAR, LIN, SAE J1850, AUTOSAR, MOST, etc., and/or may use other wired or wireless protocols, e.g., Bluetooth, etc. That is, the computer 105 can communicate via various mechanisms that may be provided in the vehicle 101 and/or other devices such as a user device. The vehicle 101 may also include one or more electronic control units specifically for receiving and transmitting diagnostic information such as an onboard diagnostics connector (OBD-II). Accordingly, the computer 105 may also have a connection to an onboard diagnostics connector (OBD-II) port, e.g., according to the J1962 standard. Via the Ethernet bus, CAN bus, OBD-II connector port, and/or other wired or wireless mechanisms, the computer 105 may transmit messages to various devices in a vehicle and/or receive messages from the various devices, e.g., controllers, actuators, sensors, etc. In addition, the computer 105 may be configured for communicating with remote devices and/or an external network, which may include various wired (e.g., cable and fiber) and/or wireless (e.g., cellular, wireless, satellite, microwave, and radio frequency) networking technologies, e.g., wired and/or wireless packet networks, wireless communication networks (e.g., using Bluetooth, IEEE 802.11, etc.), local area networks (LAN) and/or wide area networks (WAN), including the Internet, providing data communication services, etc.

The vehicle 101 autonomous driving module 106 uses data received in the computer 105, e.g., from various sensors, from a vehicle 101 communications bus, from the server 135, etc., the module 106 may control various vehicle 101 components and/or operations without a driver to operate the vehicle 101 autonomously or semi-autonomously (i.e., control some but not all vehicle 101 operations). For example, the module 106 may be used to regulate vehicle 101 speed, acceleration, deceleration, steering, gear shifts, operation of components such as lights, windshield wipers, etc.

Sensors 110 and other sources may provide data for autonomous or semi-autonomous operation of the vehicle 101. For example, various controllers in the vehicle 101 may provide data via a controller area network (CAN) bus, e.g., data relating to vehicle speed, acceleration, etc. Further, sensors 110 or the like may provide data to the computer 105, e.g., via a wired or wireless connection. Sensors 110 may include mechanisms such as RADAR, LIDAR, cameras or the like, sonar, a breathalyzer, motion detectors, etc. In addition, sensors 110 may include devices in the vehicle 101 operable to detect a temperature, position, change in position, rate of change in position, etc., of vehicle 101 components such as the computer 105, a steering wheel, brake pedal, accelerator, gearshift lever, etc. The sensors 110 may measure values relating to operation of the vehicle 101 and of the surrounding vehicles and environment. For example, the sensors 120 may measure the speed and location of the vehicle 101, a speed and location of surrounding vehicles relative to the vehicle 101, and/or environmental characteristics, e.g., altitude, speed, fuel volume, acceleration, ambient temperature, etc. Further, sensors or the like, global positioning system (GPS) equipment, etc., could be included in a vehicle and configured as data collectors 110 to provide data directly to the computer 105, e.g., geo-coordinates (latitude and longitude) of the vehicle 101 and/or geo-coordinates, a street address or the like, etc. of a location of a target destination of the vehicle 101, via a wired or wireless connection.

A memory of the computer 105 generally stores the collected data 115. Collected data 115 may include a variety of data collected in a vehicle 101. Examples of collected data 115 are provided above, and moreover, data 115 is generally collected using one or more sensors 110, and may additionally include data calculated therefrom in the computer 105, and/or at the server 125. In general, collected data 115 may include any data that may be gathered by a sensor 110 and/or computed from such data. Accordingly, collected data 115 could include a variety of data related to vehicle 101 operations and/or performance, e.g., the temperature of vehicle 101 components, data received from another vehicle, as well as data related to environmental conditions, ambient temperature, road conditions, etc. relating to the vehicle 101. For example, collected data 115 could include data concerning a vehicle 101 speed, acceleration, pitch, yaw, roll, braking, presence or absence of precipitation, tire pressure, tire condition, etc. A memory of the computer 105 may further store the parameters 116. Each of the parameters 116 generally governs control of a component of the vehicle 101. Stored parameters 116 may also include parameters for default operation of various vehicle 101 components.

Example Operation

According to the principles of the present disclosure, a memory of the computer 105 and/or autonomous driving compute cluster 106 stores instructions to determine an expected thermal load for the autonomous driving compute cluster 106. This determination may involve analyzing environmental conditions, the planned path of the vehicle, traffic conditions, etc. Upon determination of an expected thermal load for the autonomous driving compute cluster 106, a memory of the computer 105 and/or autonomous driving compute cluster 106 further stores instructions to determine a target temperature for the autonomous driving compute cluster 106 under the calculated expected thermal load. Accordingly, the vehicle 101 may anticipate and more efficiently address relatively high cooling demand situations.

Upon determination that cooling of the autonomous driving compute cluster 106 is needed, a memory of the computer 105 and/or autonomous driving compute cluster 106 stores instructions to compare a current temperature of the autonomous driving compute cluster 106, e.g., from the temperature sensor 212, and an ambient temperature, e.g., from one of sensors 110. This comparison determines whether relatively more efficient cooling via the radiators and ram air may be available, or whether a conditioning system needs to be utilized. The comparison may involve more than the computer and ambient temperature values; e.g., the comparison may also take into account a first hysteresis variable. Such a variable may be among the stored parameters 116 or a calculated by computer 105 and/or autonomous driving compute cluster 106, to account for factors such as solar load, vehicle geometry, vehicle speed, etc. may have on the effectiveness of the various cooling strategies. For example, if the vehicle 101 is operating at a high speed, the cooling effect of ram air may be more pronounced.

Next, the computer 105 and/or autonomous driving compute cluster 106 stores instructions to operate the switching valve 140 based on the comparison. Operating the switching valve 140 opens the computer portion 200 of the coolant path for the coolant 132 to one of the radiator portion 230 and the condenser portion 250.

When the switching valve 140 is open to the condenser portion 250, a memory of the computer 105 and/or autonomous driving compute cluster 106 stores instructions to operate the pump 134 in the coolant path for the coolant 132 and the compressor in the condenser portion at speeds respectively based on, according to the principles of the present disclosure, at least one of the expected thermal load and the target temperature. It is known that a memory of the computer 105 and/or autonomous driving compute cluster 106 may store instructions to determine the speed of the one or more vehicle refrigerant compressors may controlled based upon a variety variables and algorithms. If the condenser portion 250 overlaps with the cabin refrigerant subsystem 136, such as is illustrated in FIG. 2, adjustment of the speed of the compressor 254 may be limited by the control variables, algorithms, instructions, and limitations of the cabin refrigerant subsystem 136. If the condenser portion 250 is independent of the cabin refrigerant subsystem 136, such as is illustrated in FIG. 3, the speed of the auxiliary compressor 302 may likewise be adjusted independently of the compressor 254, and the independent coolant loops may be optimized for the cooling of the autonomous driving compute cluster 106 and the cabin, respectively. Furthermore, in such implementations with multiple compressors, the compressor 254 and the auxiliary compressor 302 may be different devices, with performance characteristics selected based on the different applications.

When the switching valve 140 is open to the radiator portion 230, a memory of the computer 105 and/or autonomous driving compute cluster 106 stores instructions to operate the pump 134 in the coolant path for the coolant 132. In one example, the pump 134 may initially be set to a maximum speed, stored among the parameters 116, when the switching valve opens to the radiator portion 230, and that maximum speed may be maintained for a time interval stored among the parameters 116. In another example, if the pump 134 has maintained maximum speed for a threshold number of the stored time intervals, the speed of the pump 134 may be adjusted based on at least one of the expected thermal load and the target temperature, based on stored parameters 116 and/or calculations by computer 105 and/or autonomous driving compute cluster 106.

Example Processes

FIG. 4 is a diagram of an example process 400 for cooling an autonomous driving compute cluster 106 of a vehicle 101 according to the principles of the present disclosure. The process 400 begins in a block 401 in which the computer 105 determines whether the autonomous driving compute cluster 106 is on. If not, the process ends.

If the autonomous driving compute cluster 106 is on, the computer 105 and/or autonomous driving compute cluster 106, at a block 405, calculates an estimated thermal load of the autonomous driving compute cluster 106. Following the calculation of the estimated thermal load, at a block 410, a target temperature for autonomous driving compute cluster 106, based on the estimated thermal load, is calculated.

Next, at a block 415, the computer 105 and/or autonomous driving compute cluster 106 determines whether the current temperature of the autonomous driving compute cluster 106, e.g., from the temperature sensor 212, is sufficiently below the target temperature calculated at the block 410. This determination may include application of a hysteresis variable. If the current temperature of the autonomous driving compute cluster 106 is sufficiently below the target temperature, i.e., cooling is not presently necessary, the process 400, at a block 420, waits for a stored time interval among the stored parameters 116. Then, at a block 425, the computer 105 and/or autonomous driving compute cluster 106 turns off the coolant pump 134 in the coolant path for the coolant 132, and, at a block 430, updates a loop counting variable. The process 400 then returns to the block 401.

If the current temperature of the autonomous driving compute cluster 106 is not sufficiently below target temperature calculated at the block 410, i.e., cooling is needed, the process continues to a block 435. At the block 435, the computer 105 and/or autonomous driving compute cluster 106 determine whether the current temperature of the autonomous driving compute cluster 106, e.g., from the temperature sensor 212, is sufficiently greater than an ambient temperature stored among collected data 115, e.g., from one of sensors 110. This determination may include application of a hysteresis variable.

If so, i.e., cooling may be effected via ram air, the computer 105 and/or autonomous driving compute cluster 106 execute instructions to operate the switching valve 140 to open the computer portion 200 of the coolant path for the coolant 132 to the radiator portion 230. Next, at a block 445, the computer 105 and/or autonomous driving compute cluster 106 determines whether the loop counting variable is above a threshold stored among the parameters 116. If not, at a block 450, the computer 105 and/or autonomous driving compute cluster 106 executes instructions to operate the coolant pump 134 at a maximum speed that, e.g., may be stored among the parameters 116, and continues to wait for a stored time interval, at a block 455. The stored time interval may be the same or different from that described with reference to the block 420 of the process 400. If, at the block 445, the loop counting variable exceeds the threshold, then the computer 105 and/or autonomous driving compute cluster 106 executes instructions to operate the coolant pump 134 at a speed based on at least one of the expected thermal load and the target temperature, and then the process 400 continues to the block 455. Following the block 455, the process 400 proceeds to the block 430 to update the loop counting variable, as discussed herein.

If, at the block 435, the current temperature of the autonomous driving compute cluster 106 is determined to be not sufficiently greater than the ambient temperature, the computer 105 and/or autonomous driving compute cluster 106 execute instructions to operate the switching valve 140 to open the computer portion 200 of the coolant path for the coolant 132 to the condenser portion 250. Next, at a block 470, the computer 105 and/or autonomous driving compute cluster 106 executes instructions to enable the compressor in the condenser portion 250. For example, in the implementation of FIG. 2, the compressor 254 is enabled. In another example, in the implementation of FIG. 3, the compressor 302 is enabled and the shutoff valve 306 is opened.

Next, at the blocks 475 and 480, the computer 105 and/or autonomous driving compute cluster 106 execute instructions to operate the coolant pump 134 and adjust the compressor in the condenser portion 250. As such, as noted herein, the block 480 may include the computer 105 and/or autonomous driving compute cluster 106 determining the speed of the one or more vehicle refrigerant compressors may controlled based upon a variety variables and algorithms, including at least one of the expected thermal load calculated at the block 405 and the target temperature calculated at the block 410. The computer 105 and/or autonomous driving compute cluster 106 may operate the pump 134 and/or the compressor in the condenser portion 250 at respective speeds based on at least one of the expected thermal load and the target temperature, i.e., by stored parameters 116 corresponding to those values or according to calculations incorporating those values.

At a block 485, the computer 105 and/or autonomous driving compute cluster 106 determines, similar to the block 415, whether the current temperature of the autonomous driving compute cluster 106, e.g., from the temperature sensor 212, is sufficiently below the target temperature calculated at the block 410. This determination may also include application of a hysteresis variable. If not, i.e., more cooling is necessary, the process 400 returns to the block 475. If so, at a block 490, the computer 105 and/or autonomous driving compute cluster 106 updates the loop counting variable, and the process 400 returns to the block 405.

CONCLUSION

Computing devices such as those discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A computer-implemented method, the computer having a processor and a memory, the memory storing instructions for the method executable by the processor, the method comprising:
   determining an expected thermal load for a vehicle compute cluster and a target temperature for the computer under the expected thermal load;
   comparing a current temperature of the compute cluster and an ambient temperature;
   opening, based on the comparison, a switching valve for a first coolant path to one of a radiator portion and a condenser portion, the first coolant path being thermally coupled to the compute cluster; and
   operating, with the valve open to the condenser portion, a pump in the first coolant path and a compressor in a second coolant path at speeds respectively based on at least one of the expected thermal load and the target temperature.

2. The method of claim 1, wherein the comparison of the current temperature of the compute cluster and the ambient temperature includes application of a first hysteresis variable.

3. The method of claim 2, wherein the first hysteresis variable is determined based on at least one of the expected thermal load and the target temperature.

4. The method of claim 1, further comprising:
   comparing the current temperature of the compute cluster and the target temperature.

5. The method of claim 4, wherein the comparison of the current temperature of the compute cluster and the target temperature includes application of a second hysteresis variable.

6. The method of claim 1, further comprising:
   operating, with the valve open to the radiator portion, the pump in the first coolant path for a stored time interval.

7. The method of claim 1, further comprising:
   opening the valve of the first coolant path to the radiator portion;
   comparing a loop counting variable to a stored threshold; and
   determining, based on the comparison, a speed for the pump in the first coolant path.

8. The method of claim 7, wherein the speed for the pump in the first coolant path is based on at least one of the expected thermal load and the target temperature.

9. The method of claim 7, wherein the speed for the pump in the first coolant path is a maximum value.

10. A system, comprising:
    a computer comprising a processor and a memory, the memory storing instructions executable by the processor to:
    determine an expected thermal load for an autonomous driving compute cluster and a target temperature for the compute cluster under the expected thermal load;
    compare a current temperature of the compute cluster to an ambient temperature;
    operate, based on the comparison, a switching valve in a first coolant path to open the path to one of a radiator portion and a condenser portion, the first coolant path being thermally coupled to the compute cluster; and
    operate, with the path open to the condenser portion, a pump in the first coolant path and a compressor in a second coolant path at speeds respectively based on at least one of the expected thermal load and the target temperature.

11. The system of claim 10, wherein the comparison of the current temperature of the compute cluster and the ambient temperature includes application of a first hysteresis variable.

12. The system of claim 11, wherein the first hysteresis variable is determined based on at least one of the expected thermal load and the target temperature.

13. The system of claim 10, wherein the memory stores further instructions executable by the processor to:
    compare the current temperature of the compute cluster and the target temperature.

14. The system of claim 13, wherein the comparison of the current temperature of the compute cluster and the target temperature includes application of a second hysteresis variable.

15. The system of claim 10, wherein the memory stores further instructions executable by the processor to:
    operate, with the valve open to the radiator portion, the pump in the first coolant path for a stored time interval.

16. The system of claim 10, wherein the memory stores further instructions executable by the processor to:
    open the valve of the first coolant path open to the radiator portion:
    compare a loop counting variable to a stored threshold; and
    determine, based on the comparison, a speed for the pump in the first coolant path.

17. The system of claim 16, wherein the speed for the pump in the first coolant path is determined based on at least one of the expected thermal load and the target temperature.

18. The system of claim 16, wherein the speed for the pump in the first coolant path is determined to be a maximum value.

19. A system comprising:
    an autonomous driving compute cluster, the compute cluster having a processor and a memory; and
    a first coolant subsystem thermally coupled to the compute cluster, a radiator, and a condenser; the first coolant subsystem including a coolant pump and a switching valve; the valve operable to open a computer portion of a first coolant path to one of a radiator portion and a condenser portion; the condenser being coupled in a second coolant path having a compressor;

wherein the memory of the compute cluster stores instructions executable by the processor to determine an expected thermal load for the compute cluster and a target temperature for the computer under the expected thermal load; operate the switching valve to open the computer portion of the first coolant path to one of the radiator portion and the condenser portion; and operate, with the path open to the condenser portion, the pump in the first coolant path and the compressor in the second coolant path at speeds respectively based on at least one of the expected thermal load and the target temperature.

20. The system of claim 19, wherein the condenser and the compressor are independent of a vehicle cabin refrigerant subsystem.

* * * * *